April 23, 1929.  T. A. BANNING, JR  1,710,399
STEERING MECHANISM AND THE LIKE
Filed July 3, 1924   8 Sheets-Sheet 1
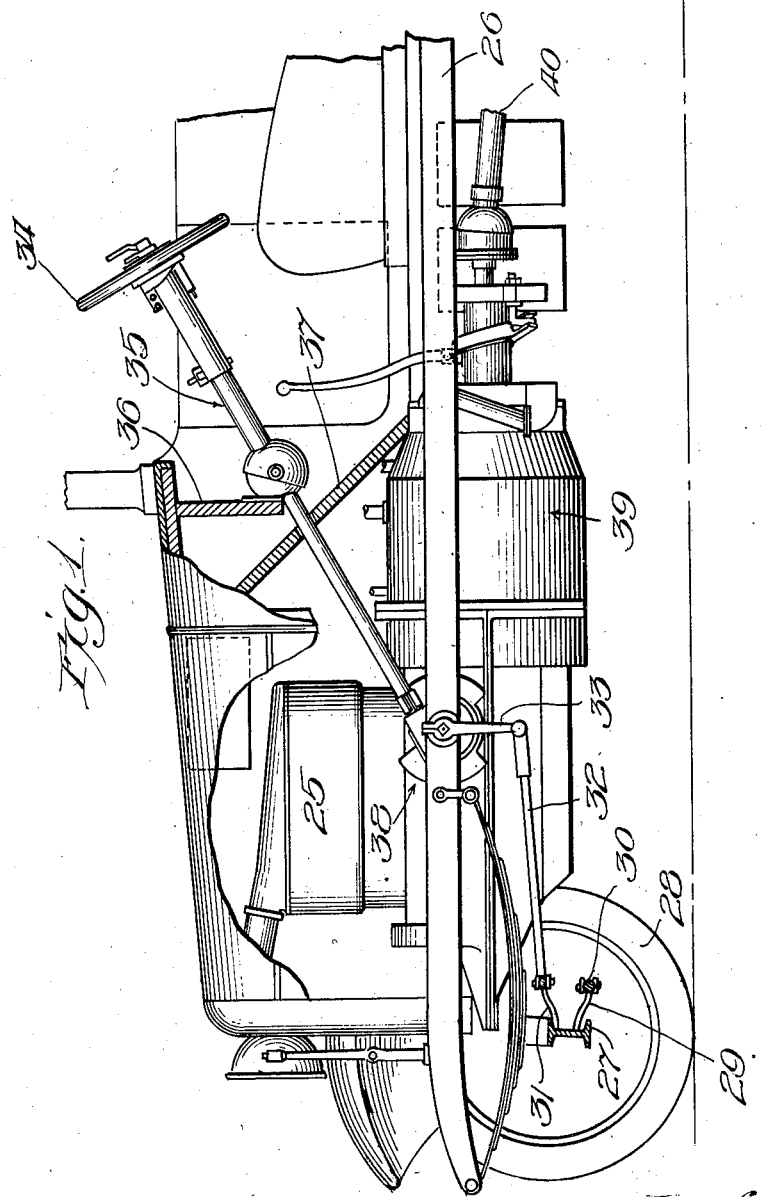

April 23, 1929. T. A. BANNING, JR 1,710,399
STEERING MECHANISM AND THE LIKE
Filed July 3, 1924 8 Sheets-Sheet 2
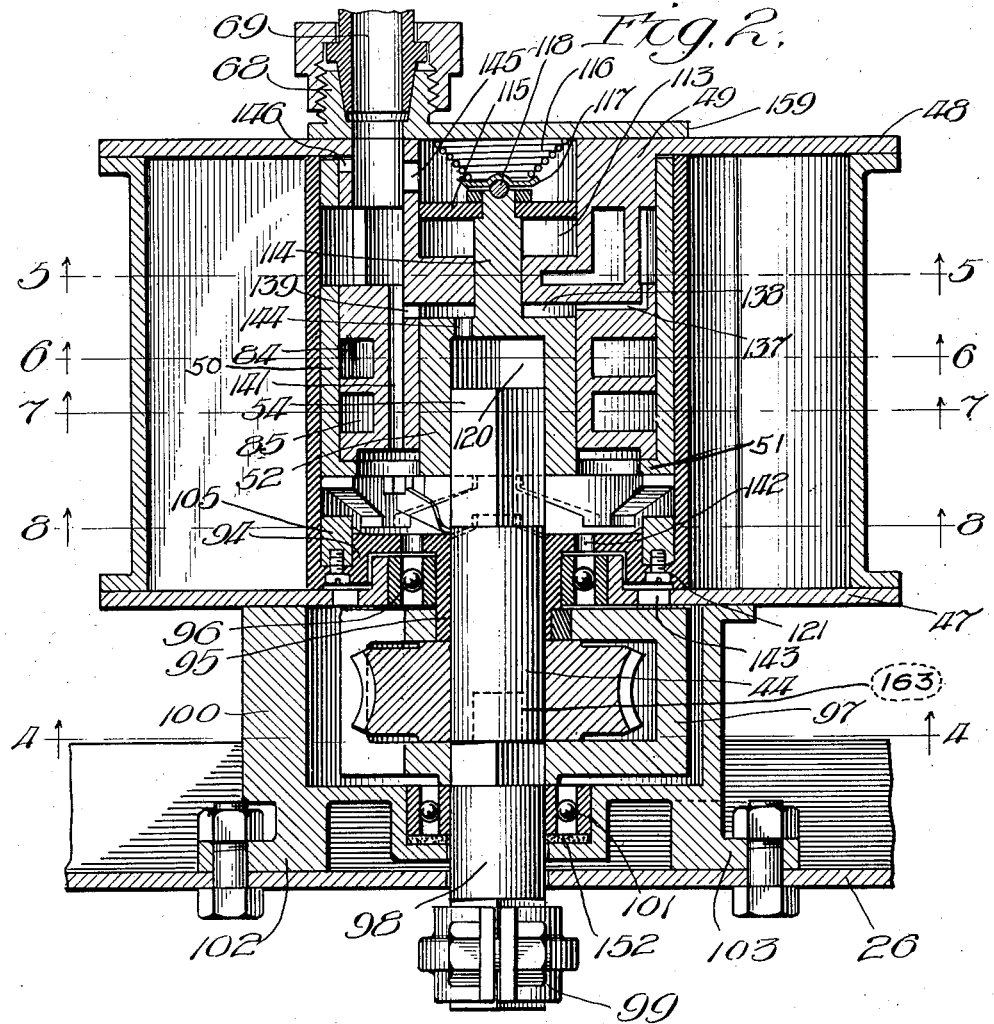
Inventor
Thomas A. Banning Jr
by
Att'ys

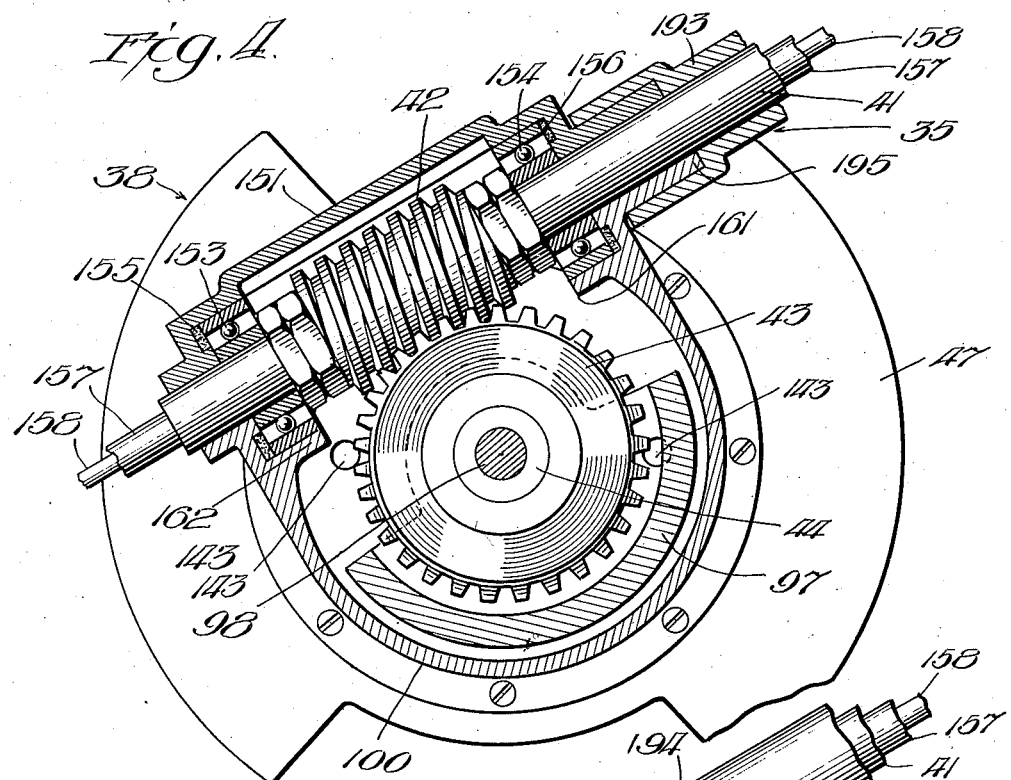
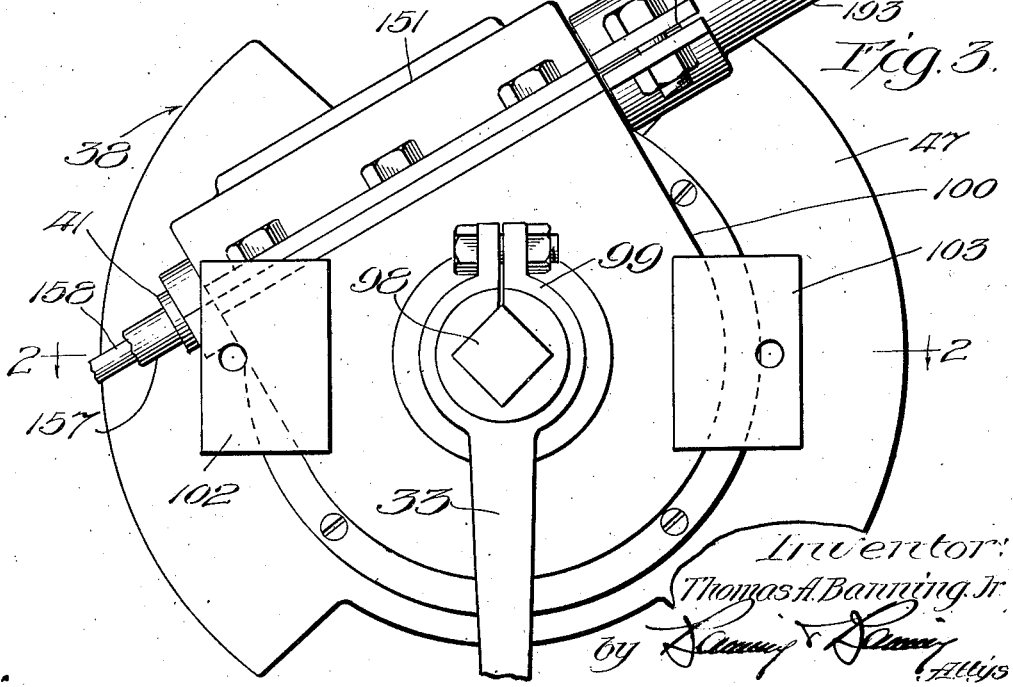

April 23, 1929.  T. A. BANNING, JR  1,710,399
STEERING MECHANISM AND THE LIKE
Filed July 3, 1924  8 Sheets-Sheet 4

Inventor
Thomas A. Banning Jr.
by Banning & Banning
Attys

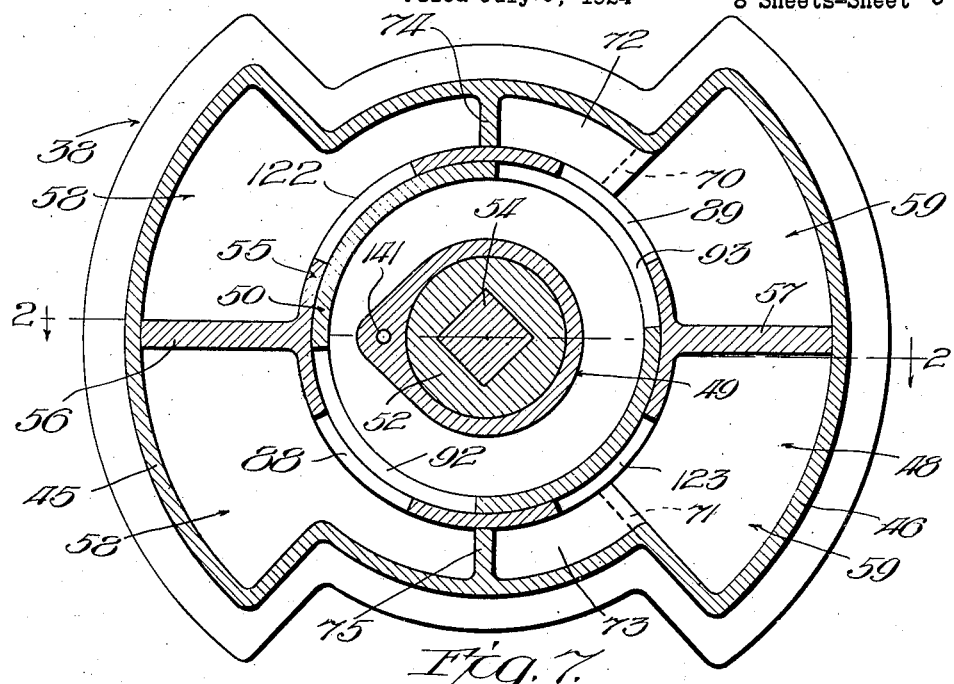

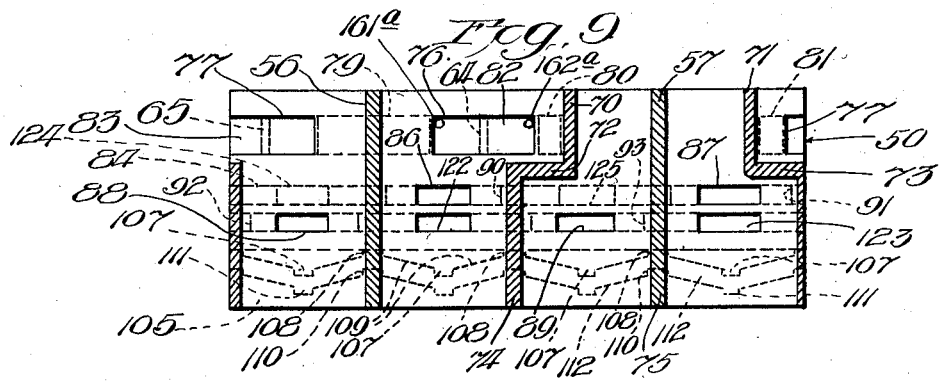
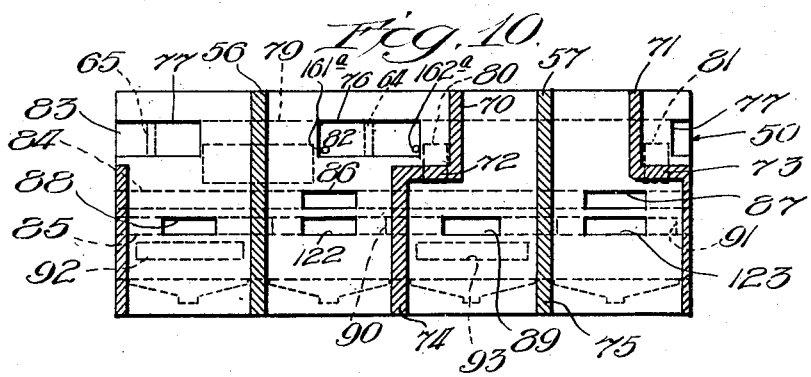
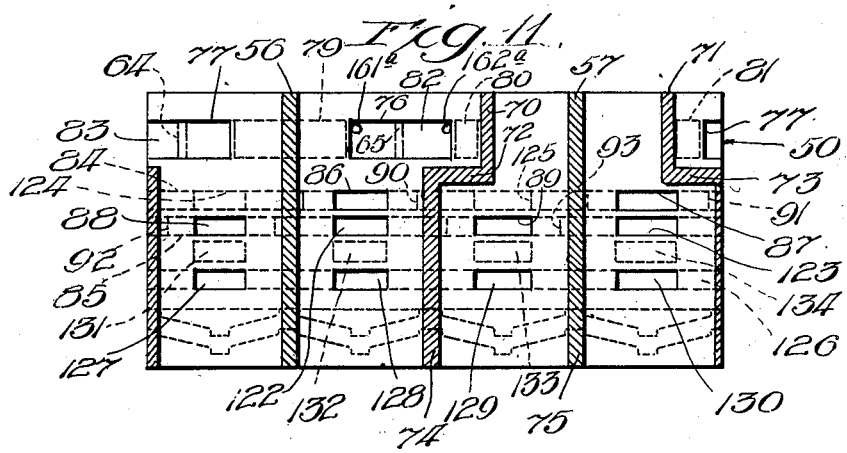

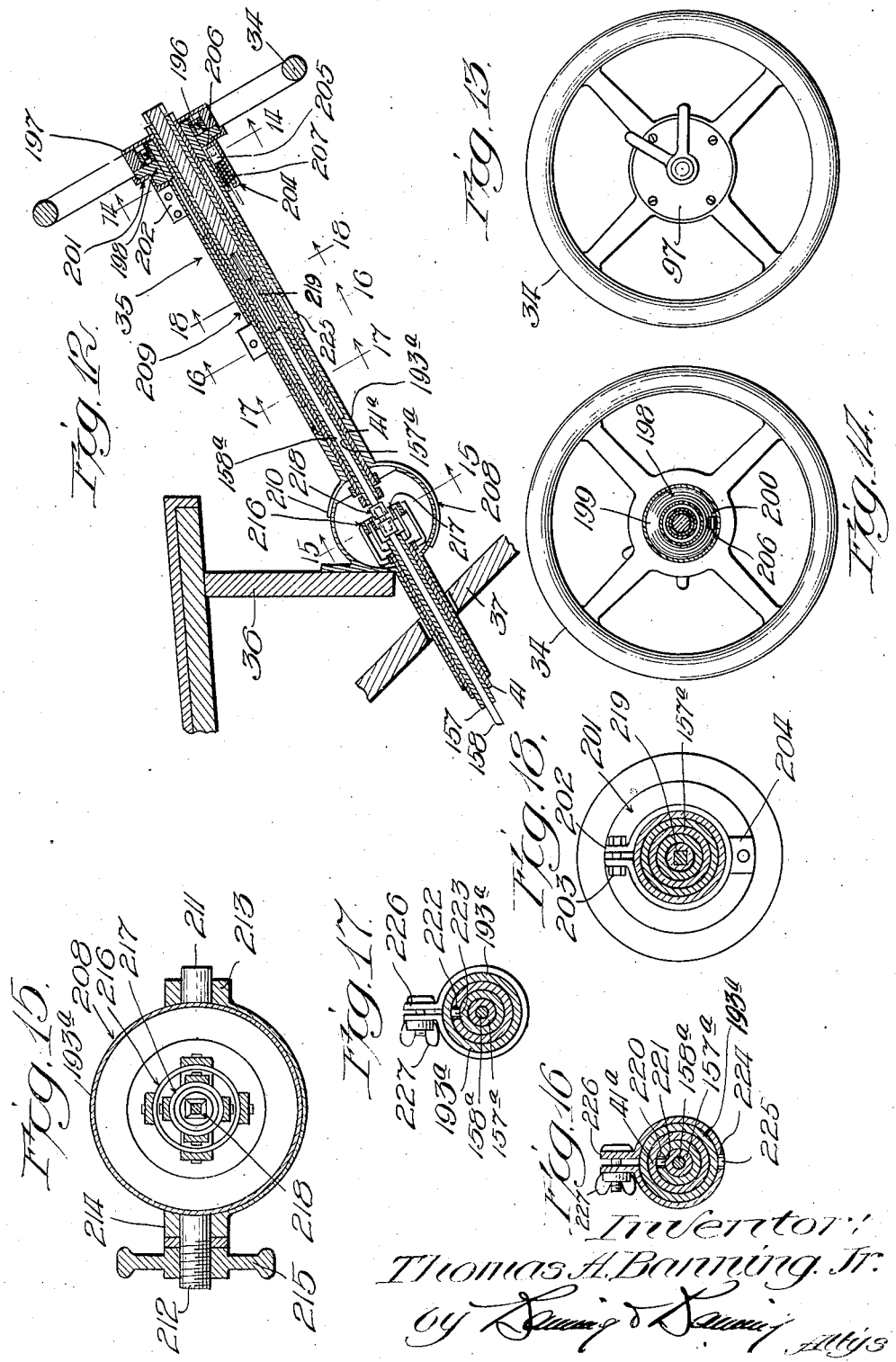

April 23, 1929.   T. A. BANNING, JR   1,710,399
STEERING MECHANISM AND THE LIKE
Filed July 3, 1924   8 Sheets-Sheet 8
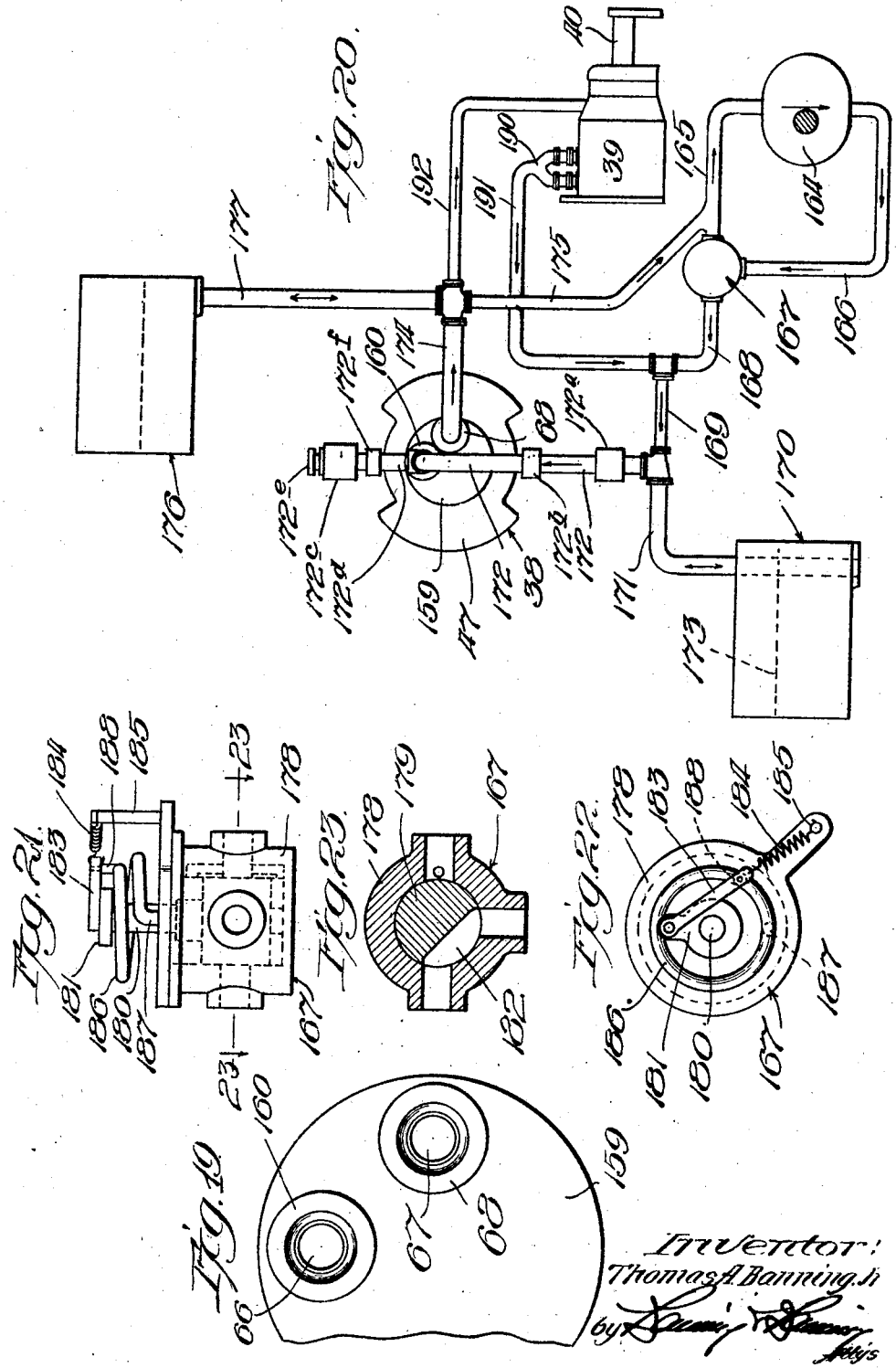

Patented Apr. 23, 1929.

1,710,399

UNITED STATES PATENT OFFICE.

THOMAS A. BANNING, JR., OF WILMETTE, ILLINOIS.

STEERING MECHANISM AND THE LIKE.

Application filed July 3, 1924. Serial No. 723,893.

This invention has to do with certain improvements in steering mechanisms and like devices. More particularly the invention has to do with certain improvements in steering mechanisms for use in steering automobiles, motor trucks, tractors and other like motor vehicles. It will appear, however, that many of the features of the invention may also be used in connection with the steering of other vehicles such as boats, aeroplanes, etc.

One of the features of the present invention relates to the provision of a steering mechanism in which the power or force necessary for the direct actuation of the wheels, rudder, or other steering device, is supplied by the use of oil or other liquid under pressure derived from a suitable source, the manipulation of the steering wheel or handle itself normally serving simply to control the delivery of the power to such fluid motor.

In connection with the foregoing it is a further object to provide an arrangement such that when the steering wheel or handle is turned to any given operative position, the steering wheel, rudder or other device, will be moved to an exactly corresponding position and held at such point until the position of the control wheel or handle is again changed. In this connection a further object of the invention is to provide a self-contained arrangement in which the valve mechanism is directly associated with the motor mechanism within a common casing, so that the necessary co-operation between the parts will be directly secured.

A further object of the invention is to provide an arrangement such that the development of the necessary operating force can be secured by the use of the oil or other fluid under pressure and direcly transmitted to the steering wheels or rudder without the necessity of using gears or other torque modifying devices within the chain of movements. In other words, this feature of the invention relates to the provision of a motor mechanism so constructed that the necessary operating torque will be directly generated in the motor itself and without the use of gears, etc.

In connection with the above feature it is an object to so arrange the motor mechanism that the operating force is generated by an angular swing; and in this connection, to provide a construction such that this angular swing will be equal to the angular movement of the drag link operating finger, rudder, or other device.

More particularly it is an object of the present invention to provide a steering mechanism of such construction that it can be conveniently built into a self-contained unit of small size and simple construction which may be directly associated to a large extent with parts and mechanisms which are well understood and of usual practice in present day automobile construction. In this connection, it is a further object to provide a unit which can be readily attached to the side beam of the vehicle chassis.

A further object of the invention is to make provision for normal operation by the use of the oil or other liquid under pressure, at which times the movements of the steering wheel or handle will merely serve to operate the valve mechanism; but to furthermore make provision for positively locking the parts together in case the oil pressure should fail or fall below a given limit. At such times the steering will be performed by direct application of hand power and the oil motor will become ineffective.

In connection with the above feature it is a further object to so arrange the parts that in the above contingency the free circulation of liquid within the motor will be allowed, so that the steering by hand will not be interfered with or obstructed. In this connection, it is a further object so to arrange the parts that the locking of the steering wheel or handle to the front wheels or rudder will take place upon the failure of the liquid pressure or its reduction to a point which would be unsafe, as distinguished from an arrangement in which the locking of the parts together is provided in every instance simply by reason of an excessive amount of handle movement as compared to the motor movement.

A further object of the invention is to provide an arrangement whereby the amount of relative movement between the steering wheel or handle and the oil motor will be limited, while at the same time making provision for sufficient relative movement to insure proper oil operation in the normal use of the device.

A further feature of the invention relates to the combination with the oil motor mechanism, of a steering wheel or handle of such construction that, if desired, the same will always tend to return to a predetermined neutral position, so that when released, it will tend to return to the central or neutral position, and turn the valve mechanism to a corresponding position. In other words, the release of the steering wheel or handle will be accompanied by a restoration of the vehicle to straight ahead or predetermined driving, such restoration being automatically performed by the liquid motor. In connection with this feature, it is a further object to provide an adjusting device whereby the exact neutral position may be easily adjusted from time to time if it should be found that when released, the steering wheel or handle did not restore the motor mechanism to the exact neutral position desired.

A further object of the invention is to provide a motor unit which is entirely filled with oil, so that all of its parts normally operate in a perfect oil bath and, therefore, to the best advantage. In this connection, it is a further object to so arrange the parts that wherever shafts or other parts extend through the casing of the unit, there will not be exerted any oil under pressure, thereby eliminating the difficulties which would otherwise be presented in the way of stuffing boxes, etc. Another feature of the invention relates to the provision of a construction such that it can be very easily made from a very few parts of simple construction and at low costs.

A further object is to combine the oil or liquid operated steering gear with any suitable source of oil pressure, whether a special pump be provided together with a pressure tank, or whether the oil under pressure be derived from some other oil mechanism such as an oil transmission or the like.

Other objects and uses of the invention will appear from a detailed description of the same, which consists in the features of construction and combinations of parts hereinafter described and claimed.

In the drawings:

Figure 1 shows a side elevation of an automobile chassis having applied thereto a steering gear embodying the features of the present invention, portions of the body being broken away so as to better illustrate the invention;

Fig. 2 shows a horizontal section through a steering unit embodying certain features of the present invention; Fig. 2 may also be considered a section on the line 2—2 of Figs. 3, 5, 6, 7 and 8;

Fig. 3 shows a side elevation of the steering unit of Fig. 2, one corner thereof being broken away;

Fig. 4 shows a vertical section on the line 4—4 of Fig. 2, looking in the direction of the arrows;

Fig. 7 shows a view taken on the line 7—7 of Fig. 2, looking in the direction of the arrows, and also corresponds to Fig. 5;

Fig. 8 shows a view taken on the line 8—8 of Fig. 2, looking in the direction of the arrows, and also corresponds to Fig. 5;

Figs. 5, 6, 7 and 8 are all taken with the valve mechanism in the position which it occupies when steering by the use of oil under pressure.

Fig. 9 shows a view of the piston member, pistons, partitions, and ports, together with a valve member, showing the relationship of the parts in the neutral position and when steering by the use of oil;

Fig. 10 is a view corresponding to Fig. 9 with the exception that the valve mechanism is shifted over due to reduction of oil pressure and the parts are clutched together for direct hand steering;

Fig. 11 shows a view corresponding to Figs. 9 and 10, but illustrates a modified form of construction in which there is a supplemental passage and ports for transmitting a free interchange of liquid between the opposite faces of the piston when steering by hand;

Fig. 12 shows a longitudinal section through a steering post and wheel which may be used for operating the steering gear, this steering post being so constructed that it can be swung into different angular positions and also so that its length can be changed;

Fig. 13 shows a top face view of the steering wheel itself;

Fig. 14 shows a section taken on the line 14—14 of Fig. 12, looking in the direction of the arrows and illustrates particularly the cam for restoring the wheel to the neutral position when released;

Fig. 15 shows a section taken on the line 15—15 of Fig. 12, looking in the direction of the arrows, and shows the universal joints which permit the posts to be articulated;

Fig. 16 is a section taken on the line 16—16 of Fig. 12, looking in the direction of the arrows, and shows the clamp for the slip joint of the steering post in section. It also shows the slip joint for the spark control;

Fig. 17 shows a section on the line 17—17 of Fig. 12, looking in the direction of the arrows. It also shows the slip joint for the steering gear control;

Fig. 18 is a section on the line 18—18 of Fig. 12, looking in the direction of the arrows. It also shows the slip joint for the gas control;

Fig. 19 is a fragmentary back view of the steering unit, showing the relative positions of the oil pressure inlet and oil pressure outlet;

Figure 5:
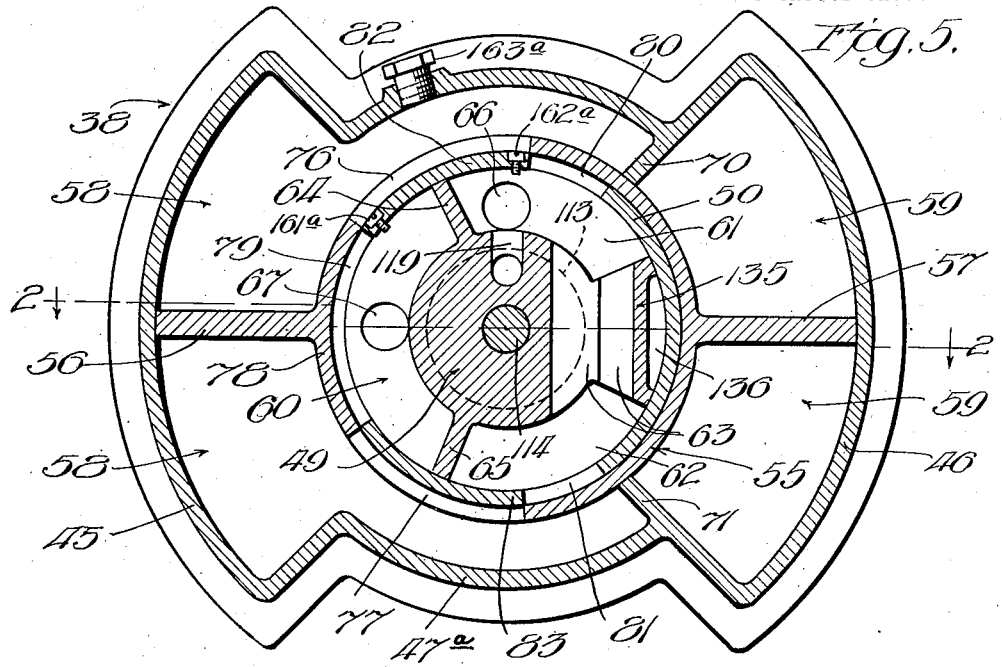
Fig. 5 shows a vertical section on the line 5—5 of Fig. 2, looking in the direction of the arrows, the valve mechanism being in the neutral position and the piston member standing at the corresponding position.

Fig. 20 shows diagrammatically a layout of parts and connections including the steering gear unit, a pump for delivering pressure oil thereto, a pressure tank in conjunction with the pump and unit, a surge tank in conjunction with the parts, a valve for controlling the delivery of oil from the pump to the pressure tank and unit or for short circuiting the pump on itself so as to avoid wastage of power when the tank carries a sufficient pressure; and also shows a typical oil transmission unit in conjunction with the steering gear as the same may be used for supplying the oil under pressure if desired;

Fig. 21 shows a side view of the control valve of Fig. 20;

Fig. 22 shows a plan view corresponding to Fig. 21; and

Fig. 23 shows a horizontal section on the line 23—23 of Fig. 21, looking in the direction of the arrows;

Referring first to Fig. 1, I have therein illustrated a steering unit embodying the features of the present invention as the same may be used in association with a typical automobile chassis together with the front wheels, as at present in use. The engine 25 is carried in the chassis including side frame bars 26 (only one of which is illustrated). The front axle 27 carries the front wheels 28 (only one of which is illustrated), said front wheels being articulated in an easy manner by the use of knuckle joints. These knuckle joints include the fingers 29 (only one of which is illustrated) which are joined together by the tie link 30. One of the knuckle joints includes the operating finger 31 which reaches sidewise and to the front end of which is connected the drag link 32 according to present practice. This drag link is moved back and forth in order to rock the finger 31 and thus turn the front wheels in the steering function.

Ordinarily, the drag link is swung back and forth by a downwardly depending finger 33 which is carried by a horizontal shaft reaching through the frame bar 26; and said shaft is rocked by a worm and gear connection from the steering wheel.

The steering wheel itself is designated by the numeral 34. It is mounted at the upper end of a steering post generally designated by the numeral 35, which steering post reaches down past the dash board 36 and through the floor board 37 to a point at the side of the engine and which may be conveniently connected to the aforesaid rock shaft.

According to one feature of the present invention I provide a self-contained steering unit 38 at the lower end of the steering post, which unit is interposed between the steering post and the rocking finger 33.

I will state that for purposes of convenience I have also illustrated the features of the present invention as embodied within a chassis which carries a transmission unit 39 of the oil type and which includes centrifugal pumping mechanisms whereby oil is placed under pressure by the rotation of the engine or by the momentum of the vehicle communicated from the rear wheels through the drive shaft 40. This transmission mechanism may be of the type disclosed, for example, in my co-pending application for Letters Patent of the United States Serial No. 650,773, filed July 11, 1923, or of any other convenient form; and as far as the oil steering gear is concerned, the same can be used either alone or in conjunction with any suitable form of transmission as desired. In those cases, however, in which the above type of oil transmission is used the necessary oil under pressure for the steering gear may be very conveniently derived without extra complications or mechanisms or costs.

Referring now to Figs. 2 to 11 inclusive particularly, the steering post includes a sleeve 41 which is connected to the wheel 34 and turns therewith. At its lower end this sleeve 41 carries a worm 42 which meshes with a worm gear 43 on a short shaft 44. This shaft reaches inwardly into a casing the general shape of which is shown in Figs. 5, 6, 7 and 8 in particular. This casing includes a pair of wing shaped compartments 45 and 46 together with a central section 47ª, and in general the casing is hollow throughout in a horizontal direction. The front and back of the casing are closed by the flat plates 47 and 48 respectively, which for this purpose may be bolted or otherwise secured to suitable flanges on the end portions of the casing.

The back plate 48 carries a forwardly reaching stationary plug 49 which is of generally circular form, but has a series of passages whose construction and purpose will be presently explained.

Figure 6:
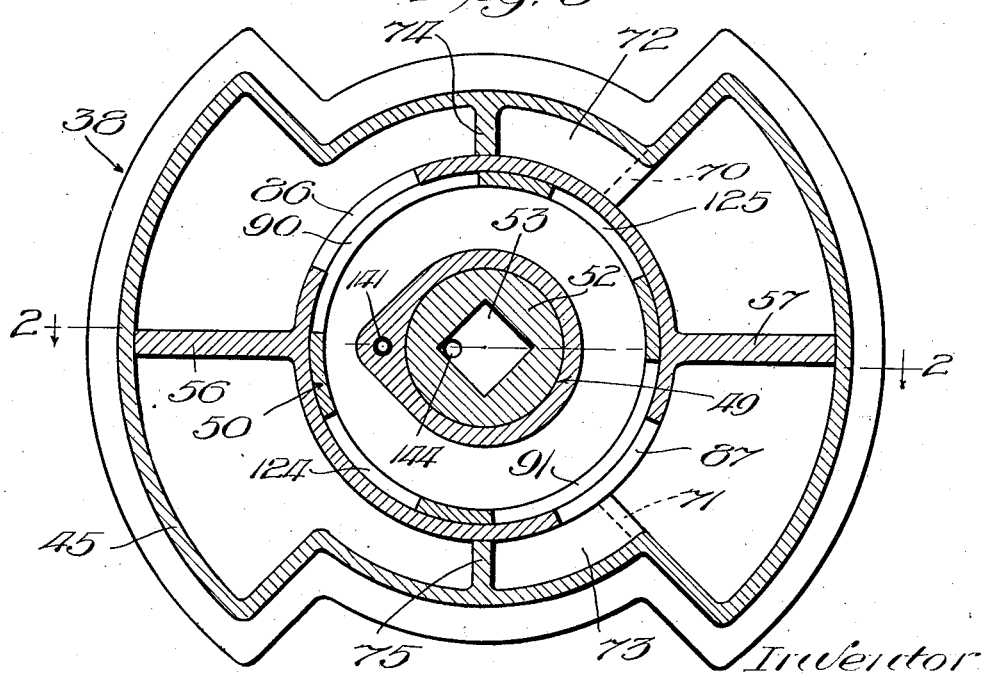
Fig. 6 shows a view taken on the line 6—6 of Fig. 2, looking in the direction of the arrows, and also corresponds to Fig. 5.

This plug 49 is of generally cylindrical form and receives a cylindrical shaped valve member 50 which is rockingly mounted on the plug. The front end of the valve member has a flange 51 which carries at its inner end a rearwardly extending socketed portion 52, best shown in Figs. 2, 6 and 7. This socketed hub portion 52 has a squared hole 53 as shown in Figs. 2, 6 and 7 which receives the squared inward end 54 of the shaft 44, previously referred to.

From the above it will be apparent that as the steering wheel 34 is turned, the valve member is turned in exact harmony in either direction depending upon the direction of turn of the steering wheel. Furthermore, at any instant the angular position of the valve is exactly dependent upon the instantaneous position of the steering wheel 34.

Surrounding the valve member 50 is a cylindrical working member 55 which turns easily thereon with a good fit. The member 55 carries the diametrically opposite paddles or pistons 56 or 57 which work within the annular chambers 58 and 59 of the casing. The outer walls of these chambers are concentric with the axis of rotation, and the paddles extend the full width of the unit between the head plates 47 and 48, so that the pistons swing within their chambers in an oil tight fashion.

In its rear portion the plug member 49 is provided with a cut away portion constituting a discharge chamber 60 which is directly opposite to the paddle 56. It is also provided with two other cut away portions constituting the high pressure chambers 61 and 62 which are joined together by a vertical passage 63, and thus in effect constitute a single high pressure chamber. The high and low pressure chambers are separated by the radial partitions 64 and 65, as well illustrated in Fig. 5.

The plug 49 also has a rearwardly extending pressure oil passage 66 which reaches to the rear of the unit and communicates with the high pressure chamber 61 to which it delivers oil under pressure. This plug is also provided with a rearwardly reaching low pressure oil discharge passage 67 which communicates with the low pressure chamber 60 from which the oil is discharged. The passages 66 and 67 terminate in nipples such as 68 of Fig. 2, which are suitably formed to receive the oil conduits such as 69 of Fig. 2.

The casing is provided with radial flanges 70 and 71 which contact the outer surface of the working member 55 and allow said working member to rotate, but serve to isolate the annular chambers 58 and 59 from each other. These radial flanges 70 and 71 are located at approximately 90° with respect to each other in their sections which overlie the valve mechanism now under consideration; but farther towards the front they are offset in an angular direction as shown at 72 and 73 in Fig. 6, and they then continue forwardly in the sections 74 and 75 which are diametrically opposite to each other as shown particularly in Figs. 6, 7 and 8. This makes it possible to carry the annular piston chamber 58 around approximately 270° of circular arc in the portion above the valve mechanism shown in Fig. 5, while covering only 180° of circular arc in the portions illustrated by the sections of Figs. 6, 7 and 8. The purpose of this will presently appear.

Opposite to the positions of the partitions 64 and 65 the operating member 55 is provided with ports 76 and 77, said ports reaching a substantial distance to both sides of the partitions when the operating member is in the neutral position of Fig. 5. In fact, the outer edges of these ports lie at a distance from the partitions substantially equal to the angular swing which the operating member should make in each direction.

The operating member is provided with an arcuate section 78 between the ports 76 and 77. Beneath the position of the section 78 the valve member is provided with a port 79. The valve member is also provided with ports 80 and 81 at the other sides of the ports 76 and 77. The valve member is also provided with shield sections 82 and 83 which normally stand opposite to the positions of the ports 76 and 77 of the operating member.

The operating and valve members together completely shut off communication between the piston chambers 58 and 59 and the high and low pressure chambers when the valve and operating members are in registry. This is true whether such registry be at the neutral position of Fig. 5 or at any other angular position.

Disregarding for the time being the piston chamber 59 and considering only the piston chamber 58, we find the following relationship: Assuming the valve member is turned in a clockwise direction through a certain angle, for example 10°, by turning the steering wheel 34, it will be found that the shield 83 of the valve member uncovers the port 77 of the operating member, and places the valve port 81 in communication with the operating member port 77; and that simultaneously the shield 82 of the valve member uncovers the port 76 of the operating member and places the port 79 of the valve member in communication with the port 76 of the operating member. The result is that high pressure oil is admitted through the ports 81 and 77 to the piston chamber 58 below the piston 56, and at the same time low pressure oil is discharged from the piston chamber 58 above the piston 56 through the ports 76 and 79 to the low pressure chamber 60. At the same time communication of the piston chamber above the piston 56 is effectively cut off from the high pressure chamber and also communication of the piston chamber below the piston 56 is effectively cut off from the low pressure chamber.

As a result the piston is forced upwards, pressure oil being admitted beneath and waste oil being discharged from above, and the movement of the piston and operating member will continue until the operating member has come into registry with the valve member. In the assumed case this will take place after 10° of swung of the operating member. Thereupon the operating member will be locked against further movement in either direction until the position of the valve member is again changed.

It will be found that upon turning the valve member a further distance in the same direction the operating member will be compelled to follow until registry is again restored. It will also be found that if the valve member is turned backwardly the communication of the high pressure and low pressure chambers with the piston chamber 58 will be reversed, high pressure oil being admitted to the top side of the piston and low pressure oil discharged from the bottom side thereof, and that the backward movement will continue until the registration of the two parts is again restored. It is also noted that the stoppage and locking action exerted on the piston member will take place upon the registration of the valve and operating members whether the valve member is standing at the neutral position or any other position within the range of swing permitted.

It is to be observed that the amount of swing which can take place in both the valve and operating members will be limited by the time when a cross connection would be established between the high and low pressure chambers directly or between the two piston chambers 58 and 59 directly. In the case illustrated in the drawings the valve member can be swung in either direction as long as the shields 82 and 83 retain contact with the partition 64 and 65. In order to make the amount of swing as large as possible while at the same time still allowing a sufficient angular space for the swinging of the piston 57 within its chamber 59, I have set the partitions 70 and 71 over at the edges of the piston chambers 51 as illustrated in Fig. 5 instead of at the points diametrically opposite to each other.

With the arrangement thus far described, it is evident that the control of the oil takes place directly with respect to the chamber 58 on both sides of the piston 56. I will now show how this communication is also established with the chamber 59 at both sides of the piston 57 and in diametrically opposite fashion compared to the piston 56.

For this purpose the plug 49 has two angularly encircling passages 84 and 85 both of which are illustrated in Fig. 2. Figs. 6 and 7 are transverse sections through these passages respectively.

In line with the passage 84 the operating member has diametrically opposite ports 86 and 87, and in line with the passage 85 the operating member has diametrically opposite ports 88 and 89. The valve member has ports 90 and 91 which normally stand in line with the ports 86 and 87; and has other ports 92 and 93 which normally stand in line with the ports 88 and 89. The ports 90 and 91, and 92 and 93 respectively, are of sufficient angular size to permit full movement with their respective operating member ports 86—87 and 88—89 respectively during the angular swings of the valve member.

With the above arrangement it is evident that diagonally opposite communication is also established between the piston chambers in such a way that the communication of pressure beneath the piston 56 is accompanied by corresponding communication of pressure above the piston 57 with simultaneous release of pressure above the piston 56 accompanied by release of pressure beneath the piston 57; and a contrary action when the communications are reversed. With this arrangement, therefore, the full capacity of the machine is doubled with relatively small increase of size, since the turning effort or torque is exactly doubled by simultaneously working on both pistons.

The operating member 55 is at its front end provided with a flange 94 which reaches inwardly and then axially and takes a bearing on the shaft 44 in its sleeve part 95. The end plate 47 takes a bearing on the part 95 by the interposed ball bearing 96 of Fig. 2.

A yoke 97 of substantially semi-circular size, as shown in Fig. 4, reaches over the worm gear 43 and its outer end has a squared socket which receives the squared inner end of a shaft 98. Said shaft 98 has its outer end squared and receives the upper end of the finger 33, previously referred to, which upper end 99 is slitted as best shown in Figs. 2 and 3, so that it can be clamped to the squared end of the shaft 98.

An extension casing 100 is secured to the front plate 47 of the casing, and said extension casing 100 provides a bearing for the shaft 98 by the ball bearing 101. The casing 100 is also provided with a pair of feet 102 and 103 which can be secured to the web of the chassis frame bar 26 in any convenient manner. The discontinuous portion of the yoke 97 is sufficiently large to allow said yoke to swing in either direction the angular distance necessary for the full back and forth swing of the drag link under the effect of this steering gear. By cutting away substantially the upper half of the yoke 97, the lower portion of the steering post and the worm carried thereby are accommodated, as shown in Fig. 4.

Examination of Fig. 2 shows that the forward end of the plug 49 and the front flange 51 of the valve member are located a sufficient distance behind the flange 94 of the operating member to establish an annular chamber therebetween. The valve member is provided with forwardly projecting clutch elements 104 which reach forwardly into said chamber; and the operating member flange 94 is provided with a circular clutch ring 105 having corresponding rearwardly extending clutch members 106 which reach into said chamber and stand intermediate between the clutch members 104. The general shape of these clutch members will be appreciated from examination of Figs. 2, 8, 9, 10 and 11. The clutch members 104 have the forwardly reaching squared teeth 107 together with the rearwardly reaching intermediate squared sockets 108, and the beveled or slanting surfaces 109 between them; whereas, the clutch members 106 have the rearwardly extending squared clutch teeth 110 together with the forwardly reaching sockets 111 and the intermediate slanting surfaces 112, as shown in the several figures. The teeth 107 and 110 of the two clutch members overlap each other in the sense that in case of a sufficient amount of angular movement as between the valve and operating members, these clutch faces will come solidly together and prevent any further angular displacement. They do, however, allow sufficient angular movement for all ordinary operations of the device in the steering function by the use of oil pressure.

The valve member is shiftable axially on the plug 49 and with respect to the operating member a certain distance, and when so shifted, the two clutch elements will be brought together, the teeth of each element taking into the sockets of the other element and locking the parts rigidly together and against relative angular movement from each other. Under such circumstances the turning of the valve member is communicated directly to the finger 33, so that the steering function is performed manually instead of by oil pressure.

In the rear portion of the plug 49 there is a cylindrical chamber 113 illustrated in Fig. 2. The hub portion 52 of the valve member has a stem 114 which reaches axially through the plug 49 and into this chamber where it carries a piston 115 working within the chamber. A helical spring 116 is placed on the back side of the piston, its forward end being carried by a plate 117 which is journaled on the stem 114 by means of a ball bearing 118.

High pressure oil is admitted to the front end of the cylinder 113 by a short passage 119 which reaches downwardly and then rearwardly in the plug member 49, as clearly shown in Fig. 5.

The tendency of the spring is to throw the valve member forwardly and thus to lock the clutch elements rigidly together. This tendency is normally overcome by the backward force of the pressure oil which holds the valve member in the position of Fig. 2. In any case, the valve member can turn with respect to the plug 49 and without distorting the spring by reason of the ball bearing 118.

The back and forth movements of the valve member take place without interference from the shaft 44 by reason of the presence of a suitable socket 120 which receives the squared end of the shaft, said socket being of sufficient depth. Nevertheless, the valve and shaft are also locked together in the sense that they turn together.

It is desirable to so arrange the parts that the differences in oil pressure which will result in a complete shift of the valve member backward or forward, shall be relatively small. For example, if it is desired to operate by oil pressure whenever the pressure exceeds say twenty-five pounds per square inch, and to operate by positive hand steering whenever the pressure is less than say twenty pounds per square inch, there must be a complete throw of the valve member in the change between twenty and twenty-five pounds per square inch. This result can be accomplished by proper design of the spring which will have sufficient resistance to overcome the force of the oil for pressures below twenty-five pounds per square inch, but not sufficient to do so for pressures above that amount.

When the valve and operating members are locked together by the clutch the shields 82 and 83 of the valve member should retain their positions in complete sealing registry with the ports 76 and 77 of the operating member. In other words, whenever the valve and operating members are clutched solidly together their relative positions should be as just above indicated. In order to insure this result, I have provided the clutch elements of the operating member in the form of a ring 105 which sets into a circular recess of the flange 94 of the operating member as indicated in Fig. 2. In assembling the machine this ring can be turned to the proper position for the desired harmonious relationship and then secured in place by the use of a series of machine screws 121, as shown in Fig. 2.

When the valve member is shifted over into the clutching position just referred to for operation by hand power, provision should be made for allowing the pistons 56 and 57 to move freely within the piston chambers. In the arrangement illustrated such provision has been made by allowing for the free transfer of oil past the pistons at such time.

For this purpose, I avail myself of the presence of the annular passage 85 of the stationary plug 49. During the shifting of the valve member axially, the operating member does not shift axially, but retains its original position.

The operating member is provided with the ports 88 and 89, already referred to, which are in line with the passage 85 and diametrically opposite to each other. It is also provided with the additional ports 122 and 123 in line with the passage 85 and diametrically opposite to each other, but at the opposite sides to the pistons 56 and 57.

The valve member is provided with the ports 92 and 93 which are normally in line with the passage 85 and the ports 88 and 89, but the valve member is not provided with ports to register with the ports 122 and 123 when in its normal position.

When the valve member shifts axially to the clutching position its ports 90 and 91 will come into registry with the ports 122 and 123 of the operating member, and the valve member is then provided with the additional ports 124 and 125 which are normally in line with the annular passage 84, but sealed by the operating member itself when the valve member is in the normal position. When the valve member shifts to the clutching position the ports 124 and 125 come into registry with the ports 88 and 89 of the operating member, and also with the passage 85.

It is thus evident that as soon as the clutching position is assumed communication is established by way of the passage 85 between both faces of both of the pistons. Under these circumstances the pistons can rock freely for steering by hand power without interference from the presence of the oil.

The relative positions of the various ports are well indicated in Figs. 9 and 10 wherein the parts are laid out in a flat plane representing the entire circumference. It is also observed that the operating member has the four ports 88, 89, 122 and 123 in line with the annular passage 85 and the additional ports 86 and 87 in line with the annular passage 84 and opposite to the ports 122 and 123 respectively. It is also evident that in the normal position of the valve member its ports 90, 91, 124 and 125 are in line with the annular passage 84; whereas its ports 92 and 93 are then in line with the annular passage 85. Upon shifting the valve member into the position of Fig. 10, all four of the valve member ports are brought into registry with all four of the operating member ports and the annular passage 85. At the same time the valve member ports 79, 80 and 81 shift sidewise, but do not move a sufficient distance to communicate with the annular passage 84. Thus the pressure oil is retained properly isolated from the discharge low pressure chamber.

In case it should be desired to provide an increased port area and passage capacity for allowing the above mentioned cross communication, this can be done as shown in Fig. 11 by the provision of a supplemental annular passage 126 in the stationary plug, an additional series of passages 127, 128, 129 and 130 of the operating member in line therewith, and a supplemental series of ports 131, 132, 133 and 134 of the valve member properly placed to allow cross communication between the ports 127, 128, 129 and 130, and the passage 126, when the valve member is shifted sidewise.

It is desirable to balance the pressures and force as much as possible, and also to prevent the accumulation of back pressures at disadvantageous points due to the seepage of oil under pressure. Both of these results have been accomplished in the present case. It is noted that the two pistons are diametrically opposite to each other and of equal area and that the up pressure on one side is exactly balanced by the down pressure on the other side. Consequently, a perfect turning effort is secured and side thrust due to pressure on the pistons eliminated.

Considering the pressures within the valve member, the side thrust toward the right in Fig. 5 is equal to the difference in area presented to the action of pressure oil towards the right as compared to that towards the left. I have provided a blind space 135 between the upper and lower pressure chambers 61 and 62 which blind space is recessed as at 136, and communicates by a passage 137 with the space 138 at the back side of the hub member 52. This space 138 communicates with the low pressure chamber 60 by a passage 139, as shown in Fig. 2, and thus the space 136 of Fig. 5 is at low pressure.

The front flange 51 of the valve member is provided with a series of relatively large passages 140 through which oil can freely circulate as the valve member shifts back and forth, and through which passages also the front portion of the interior of the machine is placed in communication with the low pressure chamber by means of a drain passage 141 of the plug 49. The flange 94 of the operating member is provided with a series of passages 142 which allow communication of oil pressure thereto; and the front head 47 is provided with a series of passages 143 which allow communication of oil pressures between the supplemental casing 100 and the interior of the main element.

The space 120 behind the squared end 54 of the valve shaft 44 communicates with the space 138 by a drain passage 144. The space at the back side of the piston 115 communicates with the low pressure chamber by a relatively large passage 145; and the space at the rear ends of the operating and valve members communicates with the low pressure chamber by a drain passage 146.

It is thus evident that all parts and surfaces where there might possibly be an accumulation of back pressure due to seepage are effectively drained, and thus the building up of serious back pressures is avoided.

The only force necessary to turn the valve member with the arrangement thus far described is the frictional resistance which will necessarily be very slight. It may be desirable in some cases to have an increasing amount of resistance exerted as the valve member is moved more and more out of register from the operating member. When this result is desired it can be easily secured by the use of suitable spring connections between the valve and operating members. Two such springs are illustrated in Figs. 2 and 8, being the springs 147 and 148, located diametrically opposite to each other. Each consists of a short length of strap spring steel twisted in its central portion at right angles. The flat end is riveted or otherwise firmly secured to the face of the flange member 94 of the operating member, and the outwardly projecting twisted end of the spring is also deflected away from the flange member 94 and engages suitable lugs 149 and 150 on the face of the flange 51 of the valve member. The springs are so set that they tend to hold the valve and operating members in the closed port position. Any turning of the valve in either direction is accompanied by a proportional resistance due to the deflection of the springs. For example, if the vehicle is traveling straight along the road and the valve member is turned a certain angle a proportional spring resistance will be encountered. As the operating member turns under the oil pressure and approaches the angular position of the valve member, this spring resistance will decrease until, when the registry is again formed, the springs are no longer under deflection.

The upper portion of the supplemental housing 100 is closed by a cover plate 151 in an oil tight manner. It is also preferred that a suitable felt gasket 152 (see Fig. 2) be placed at the outside of the ball bearing 101 so as to eliminate seepage of oil at this point. The sleeve 41 of the steering post is carried clear thru the upper portion of the supplemental housing 100 and is carried by ball bearings 153 and 154, so that it turns very easily. It is preferred that felt gaskets 155 and 156 be placed at the outside ends of these ball bearings. The sleeve 157 for the spark control and the shaft 158 for the gas control pass down through the steering sleeve 41 and thus their lower ends can be connected to the proper parts of the motor in the usual manner.

The rear end of the piston chamber 113 (see Fig. 2) is preferably closed by a cover plate 159, which cover plate is also provided with the nipples 68 and 160 for the discharge and high pressure connections respectively.

It is thus evident that all of the operating parts are carried within a thoroughly enclosed casing. The only points of communication thereinto are at the positions of the three gaskets previously referred to, and at these points there is no oil pressure exerted. Therefore, the tendency to leak is reduced to a minimum. Furthermore, the worm and worm gear and the ball bearings at the lower end of the steering post itself operate in a perfect oil bath.

Ordinarily the operating and valve members will have their ports so proportioned as to allow a slight overlap when the two members are in the fully registered position, but this overlap will in most cases be very small. Such overlap, however, if present, will allow a very slight movement of the front wheels or rudder independently of the steering wheel, which slight amount of movement is usually of advantage for giving an easier riding quality.

It will be noted, however, that if at any time the operating member should be forced in either direction by a movement communicated from the front wheels or rudder as the case may be, it would immediately encounter a resistance dependent upon the full amount of the oil pressure as soon as the ports are opened. For example, if the operating member is turned in the clockwise direction in Fig. 5, while holding the valve member stationary, the ports 76 and 80 will be thrown into communication, thus exerting the full oil pressure on the top face of the piston 56 and bottom face of the piston 57 and thus immediately resisting such movement. A similar resisting action will take place with a contrary movement of the parts.

It is also noted that the swing of the operating member in either direction would be limited by the engagement of the yoke 97 with the shoulders 161 and 162 of the auxiliary casing 100. The parts may be so designed that such engagement will take place before the operating member overrides the limits of movement permissible within the mechanism.

It is also noted that the swing of the valve member in either direction is limited by the engagement of the clutch elements. By proper design of these clutch elements an excessive valve movement is prevented. The valve member itself may be provided with a pair of stops 161$^a$ and 162$^a$ (see Fig. 5) which are located in the shield 82 at opposite sides of the partition 64 and serve to limit the extreme movements of the valve member. In this way, the valve member is prevented from overriding the high pressure and low pressure chambers and communication between them is avoided.

These stops 161$^a$ and 162$^a$ may be in the form of machine screws set through the shield from above, and for this purpose, the casing is shown as being provided with a screw plug 163ª through which, when removed access may be had to the valve member for the insertion of the aforesaid stops.

The shafts 44 and 98 may be journaled together at their adjoining ends as shown by the stub 163 on the shaft 98 which is journaled in the shaft 44 as shown in Fig. 2.

It is noted that the steering unit itself is so designed as to make use of the force of the liquid under pressure to the best advantage for exerting torque. This is because the pistons or blades are placed at the outside of the device where they have the greatest radius with respect to the axis of rotation. Conversely, the valve mechanism and other control parts are placed at the center of the device which would be more or less ineffective for the exertion of a turning effort. In this way the parts are brought into a very compact relation and the space is utilized to the best advantage. Furthermore, it is noted that by placing the pistons or blades on the horizontal axis, it is possible to reduce the vertical dimension of the casing and bring the entire structure into a more or less elongated form, horizontally. Thus it conforms in a better manner to the requirements of convenient adjustment to the chassis frame and without interference with other structures or devices.

Manifestly, the delivery of pressure oil to the device may be from any convenience source. In some cases, the pressure oil is already available, as for example, for the operation of hoisting devices of dump trucks, etc.

I have, however, in Fig. 20 shown diagrammatically a convenient system of oil supply. The same includes a gear pump 164 drawing oil from the connection 165 and delivering it through the connection 166. The oil so delivered passes through the control valve 167 and is normally sent through pipes 168 and 169 either to the pressure storage tank 170 or directly to the steering unit 38. For this purpose, the pipes 171 and 172 are provided. The pressure storage tank 170 is conveniently in the form of an air tight tank having the pipe 171 terminating near the bottom thereof. The oil is forced into the tank 170 until it reaches a level 173 where the pressure of the oil and the air pressure balances.

The oil discharge from the steering device passes by a connection 174 either to the inlet side of the pump by a pipe 175 or to a surge tank 176 by a pipe 177.

The pump 164 will ordinarily be continuously driven from the engine 25 and its rate of delivery will therefore be more or less proportioned to the speed of the engine. The valve 167 serves to control the oil delivered from the pump. This valve includes a casing 178 having a vertical plug 179 therein, a stem 180 of which plug reaches outside of the casing and carries a crank 181. The valve has three connections for the pipes 165, 166 and 168 respectively. The plug has a segmental notch 182 in one side and by a quarter turn places the pipe 166 in communication either with the delivery pipe 168 or the return pipe 165.

A link 183 connects to the crank 181 and by a spring 184 to a fixed pin 185. A coiled extension pipe 186 has its lower end 187 fixed rigidly to the casing and in communication with the port of the discharge pipe 168. The other end of the pipe 186 is closed and has the upstanding finger 188 which engages the link 183. When the pressure rises to the desired upper limit, the pipe 186 will straighten out sufficiently to carry the stem 188 past the dead center position of the link and spring connection, so that the valve plug will then be snapped over suddenly to the opposite side from that shown in Fig. 22. This will immediately reverse the connections, discontinuing the delivery of pressure oil to the tank 170 and allowing the oil to simply circulate through the pump without material wastage of power. When the pressure in the tank 170 falls to a sufficiently low degree the pipe 186 will curl back sufficiently to reverse the position of the valve and the delivery of oil into the tank will be resumed.

In some cases oil under pressure may be derived from another convenient source, as for example, an oil transmission mechanism. I have, therefore, illustrated a transmission mechanism 39 having a discharge connection 190 which may be connected by a pipe 191 with the pipe 169 leading to the tank 170; and a return pipe 192 leads from the pipe 174 back to the transmission mechanism.

If desired a pressure control valve 172ª can be placed in the connection 172 which delivers the oil under pressure to the apparatus, so that whenever the pressure falls below a certain point this valve will suddenly close and completely cut off the supply of oil under pressure, thus allowing the spring 116 of Fig. 2 to operate suddenly and throw the valve member clear over into the fully clutched position. As soon as the pressure again rises to the proper point, the valve 172ª will reverse position and cause the application of the full oil pressure to the space 113 behind the piston 115 which will thus be suddenly projected into the position of Fig. 2 with consequent disengagement of the clutch members and operation by oil pressure.

If desired, a check valve 172ᵇ may be placed in the oil pressure supply pipe 172 to prevent backward movement of oil therethrough. In this connection, it is noted that any tendency to force the operating member in either direction away from the closed port position, without corresponding valve movement, results in a tendency to force oil back into the pressure chambers 61 and 62 and backwardly through the supply pipe 172. The check valve when used will effectively prevent any back movement. In case the pressure chamber 61 and immediately connected parts are completely filled with oil, the check valve will absolutely lock the operating member against any movement in either direction when such movement originates in the operating member and is not accompanied by a proper valve movement.

In some cases it may be desirable to allow a slight movement of the operating member to take place against the resistance caused by the check valve (over and above any slight movement due to "lap" of the ports of the valve and operating members). I have, therefore, illustrated in Fig. 20, a closed chamber 172$^c$ of relatively small capacity connected with the pipe 172 in advance of the check valve 172$^b$ by means of a connection 172$^d$. Since the chamber 172$^c$ is at a higher elevation than the pressure chamber 61, it follows that the oil pressure will trap air in the upper portion of the chamber 172$^c$ which will serve as a cushion and will allow a slight yielding action on the part of the operating member. The resistance to this yielding action will increase as the operating member is moved by itself until the air pressure so trapped is sufficient to stop further movement.

This slight yieldability under pressure would be of advantage in many cases, as for example, in ship steering wherein the operating member is connected to the rudder post. In such cases the side slap on the rudder would cause violent strain in the rudder post, but the slight yieldability under pressure will largely reduce the violence of these strains.

If desired, a plug 172$^e$ can be provided in the upper portion of the chamber 172$^c$, by means of which plug the quantity of air trapped can be adjusted.

If desired, a valve 172$^f$ can be placed in the pipe 172$^d$ so as to shut off communication with the chamber 172$^c$, in which case the device will operate with a positive lock against the movement of the operating member independently of valve movement.

Since normally only a very small force is needed for operating the valve member it is possible to use a more or less flexible steering post. I have, therefore, illustrated such a construction in the drawings. The same includes the outside stationary sleeve 193, the lower end of which is preferably split, as shown at 194 in Fig. 3, and may be clamped onto a neck extension 195. The steering sleeve 41, spark sleeve 157 and gas rod 158 are telescoped within the stationary sleeve 193.

The steering wheel 34 is journaled on the upper end of the stationary sleeve by a ball bearing 196, as shown in Fig. 12, and the upper end of the steering sleeve 41 is flanged, as shown at 197, and is secured to the steering wheel. The steering wheel, therefore, turns very easily.

On the bottom face of the steering wheel is mounted a circular cam block 198 having its thickest and thinnest portions 199 and 200 diametrically opposite to each other, as shown in Figs. 12 and 14.

A sleeve 201 is rotatably mounted on the upper end of the fixed sleeve 193 but has a split portion 202 which can be clamped together by the use of bolts 203 so as to fix the collar 201 in any angular position.

The collar 201 carries a box 204 within which is slidably mounted a spring pressed plunger 205 having a roller 206 which rides on the cam surface 198. The spring 207 forces the roller firmly against the cam block and thus tends to restore the steering wheel 34 to such a point that the roller is at the thinnest point 200 of the cam block. In this way also the neutral position of the valve member is established. By turning the sleeve 201 into different positions, this neutral position can be changed or corrected as desired by the driver. Ordinarily, it will be set for straight ahead driving, but in some cases, as for example in the motor boat steering, it might be desirable to set the rudder temporarily at some other position than the straight ahead control.

The steering post together with the various controls are shown as provided with a ball and socket joint 208 by which the angular position can be changed and with slip joints 209 by which the length of the entire steering column can be adjusted. For the first purpose the fixed sleeve 193 is divided into two parts, the upper portion of which is designated 193$^a$, the two parts being joined together by a ball and socket joint 210. The two parts are joined together on a horizontal axis, as shown in Fig. 15, including the studs 211 and 212 which are fixed to one member of the universal joint, and the collars 213 and 214 fixed to the other member thereof. A hand wheel 215 serves as a convenient means for locking the parts together to fix them in the desired position.

The sleeves 41 and 157 and the rod 158 are joined together by universal joints 216, 217 and 218 respectively, all concentrically located within the ball and socket joint 208. The sections of these sleeves and rod just above said universal joints are designated 41$^a$, 157$^a$ and 158$^a$ respectively.

The stationary sleeve as well as the sleeves 41 and 157 and rod 158 are provided with slip joints by which their proper relationship is maintained while they may be either elongated or shortened according to the position of the wheel 34. For this purpose the rod 158ᵃ has its upper end squared, as squared at 219 in Fig. 18, said squared end taking into a squared recess in the other section of the rod. The sleeve 157ᵃ is telescoped as shown in Fig. 16, one section having a longitudinal slot 220 which receives a pin 221 of the other section. The section 41ᵃ is also telescoped, one section having a longitudinal slot 222 and the other section a pin 223, as shown in Fig. 17. The outside stationary sleeve 193ᵃ is telescoped, as shown in Fig. 16, one section having a longitudinal slot 224 and the other section a pin 225 working therein. The outside telescoped section of the stationary sleeve 193ᵃ is split, as shown at 226 in Fig. 17, and its two parts can be clamped together by the use of a wing nut 227, as shown in Figs. 16 and 17.

The construction herein illustrated and particularly described includes certain elements and devices which may or may not be used or may be used in various combinations with each other as desired according to the particular work and requirements for which any given installation is intended. For example, in some cases the springs 147 and 148 of Figs. 2 and 8 in particular will not be used; in other cases the compression space of the chamber 172ᶜ of Fig. 20 will not be used; in other cases the check valve 172ᵇ will not be used.

In some cases also it will be unnecessary to make any special provision for clutching the valve and operating members together, even when the oil pressure falls below a certain point, as for example, in ship steering, or in the steering of road rollers, etc.

It will, therefore, be evident that I contemplate the use of various combinations and arrangements of devices within the scope of the present disclossure and the claims to be hereinafter appended.

It will also be noted that the unit includes what may be termed a servo-motor, that is, a power actuated device under manual control; and it will also be noted that this device may be used for a wide variety of purposes besides steering.

Therefore, I do not limit myself to the particular construction illustrated in the drawings, except as I may do so in the claims.

I claim:

1. In a device of the class described, the combination of a hollow cylindrical motor member having a pair of oppositely disposed outwardly projecting paddles, arcuate cylinders within which said paddles swing in liquid tight fashion, a relatively large port in said motor member at each side of one of the paddles aforesaid, communicating directly with the arcuate cylinder in which said paddle works, a hollow cylindrical valve member working within the motor member in liquid tight fashion, and establishing shields of proper size and shape to normally underlie the motor member ports and close the same in liquid tight fashion, ports in the valve member at both sides of both of said shields, a stationary partition within and co-operating with the valve member in liquid tight fashion to establish a low pressure liquid chamber within the valve and motor members and adjacent to the paddle of the cylinder communicating with the motor member ports, and to establish a high pressure chamber within the valve and motor member at the opposite side of the device, said partition normally contacting the central portions of the shields, and means for connecting the spaces of the other arcuate cylinder at the two sides of the paddle therein with the diagonally opposite spaces of the first mentioned arcuate cylinder at the two sides of the paddle therein, substantially as described.

2. In a device of the class described, the combination of a hollow cylindrical motor member having a pair of oppositely disposed outwardly projecting paddles, arcuate cylinders within which said paddles swing in liquid tight fashion, a relatively large port in said motor member at each side of one of the paddles aforesaid, communicating directly with the arcuate cylinder in which said paddle works, a hollow cylindrical valve member working within the motor member in liquid tight fashion and establishing shields of proper size and shape to normally underlie the motor member ports and close the same in liquid tight fashion, ports in the valve member at both sides of both of said shields, a stationary partition within and cooperating with the valve member in liquid tight fashion to establish a low pressure liquid chamber within the valve and motor members and adjacent to the paddle of the cylinder communicating with the motor member ports and to establish a high pressure chamber within the valve and motor members at the opposite side of the device, said partition normally contacting the central portions of the shields, and means for limiting the swing of the valve member with respect to the partition member to insure sealing engagement of the shields with the partition at all times, and means for connecting the spaces of the other arcuate cylinder at the two sides of the paddle therein with the diagonally opposite spaces of the first mentioned arcuate cylinder at the two sides of the paddle therein, substantially as described.

3. In a device of the class described, the combination of a hollow cylindrical motor member having a pair of oppositely disposed outwardly projecting paddles, arcuate cylinders within which said paddles swing in liquid tight fashion and having diagonally opposite arcuate cylinder sections, a relatively large port in said motor member at each side of one of said paddles aforesaid communicating directly with the arcuate cylinder in which said paddle works, a hollow cylindrical valve member working within the motor member in liquid tight fashion, and establishing shields of proper size and shape to normally underlie the motor member ports and close the same in liquid tight fashion, ports in the valve member at both sides of both of said shields, a stationary partition within and co-operating with the valve member in liquid tight fashion to establish a low pressure liquid chamber within the valve and motor members and adjacent to the paddle of the cylinder communicating with the motor member ports, and to establish a high pressure chamber within the valve and motor members at the opposite side of the device, said partition normally contacting the central portions of the shields, and suitable passages within the partition member together with corresponding ports in the valve and motor members establishing communication between the diagonally opposite sections of the two arcuate cylinders, substantially as described.

4. In a device of the class described, the combination of a hollow cylindrical motor member having a pair of oppositely disposed outwardly projecting paddles, arcuate cylinders within which said paddles swing in liquid tight fashion and having diagonally opposite arcuate cylinder sections, a relatively large port in said motor member at each side of one of said paddles aforesaid communicating directly with the arcuate cylinder in which said paddle works, a hollow cylindrical valve member working within the motor member in liquid tight fashion and establishing shields of proper size and shape to normally underlie the motor member ports and close the same in liquid tight fashion, ports in the valve member at both sides of both of said shields, a stationary partition within and co-operating with the valve member in liquid tight fashion to establish a low pressure liquid chamber within the valve and motor members and adjacent to the paddle of the cylinder communicating with the motor member ports, and to establish a high pressure chamber within the valve and motor members at the opposite side of the device, said partition normally contacting the central portions of the shields, and suitable passages establishing communication individually between the diagonally opposite sections of the two arcuate cylinders, substantially as described.

5. In a device of the class described, the combination of a motor member mounted for oscillation about a fixed axis, radial piston members projecting therefrom at diametrically opposite points, liquid tight arcuate cylinders within which said pistons may swing, companion valve members located adjacent to the motor member, means for delivery liquid under pressure to said valve members at points adjacent to the extremes of movement of one of the radial piston members, means adjacent to said valve members permitting removal of liquid from points adjacent to said piston member, and separate passages establishing communication directly between the arcuate cylinders at points diagonally opposite to each other and at opposite sides of the piston members and independently of the liquid pressure delivery and removal passages, the valve members being provided with co-operating ports and shields adapted to seal each other and the arcuate cylinders from the liquid delivery means and the liquid removing means when the valve members stand in a given relative position with respect to each other, whereby admission and delivery of liquid to and from one cylinder is permitted with a maximum angular swing of the motor member, and whereby liquid is simultaneously delivered to and from the other cylinder at diametrically opposite points with corresponding increase of power, substantially as described.

6. In a device of the class described, the combination of a motor member mounted for oscillation about a fixed axis, two radial piston member projecting therefrom, liquid tight arcuate cylinders within which said piston members may swing, companion valve members located adjacent to the motor member, one of said valve members being free for longitudinal movement as well as rotation, means for delivering liquid under pressure adjacent to said valve members at points adjacent to the extremes of movement of one of the radial piston members, means permitting removal of liquid from points adjacent to said piston member, separate passages adjacent to the valve members and underlying diagonally opposite portions of the cylinders, the valve members being provided with co-operating ports and shields adapted to seal each other and the arcuate cylinders from the liquid delivery means and the liquid removal means when the valve members stand in a given relative position with respect to each other, and also being provided with other ports normally establishing communication between diagonally opposite portions of the cylinders and the aforesaid separate passages in pairs and also permitting the establishment of communication between opposite sides of each piston member within its respective cylinder when said valve member is shifted longitudinally, substantially as described.

7. In a device of the class described, the combination of a motor member mounted for oscillation about a fixed axis, a radial piston member projecting therefrom, a liquid tight arcuate cylinder within which said piston member may swing, companion valve members located adjacent to the motor member, and capable of movement parallel to the piston member movements, one of said valve members also being free for movement at right angles to the direction of piston movement, means for delivering liquid under pressure adjacent to said valve members at points adjacent to the extremes of movement of the piston member, means permitting removal of liquid from points adjacent to said piston member, a passage adjacent to the valve members, the valve adjacent to the valve members, the valve members being provided with co-operating ports and shields adapted to seal each other and the arcuate cylinder from the liquid delivery means and the liquid removal means when the valve members stand in a given relative position with respect to each other, and also being provided with other ports permitting establishment of communication between opposite sides of the piston member within its cylinder when said valve member is shifted longitudinally, substantially as described.

8. In a device of the class described, the combination of a piston member, companion valve members located adjacent thereto and normally movable in a given direction to control the delivery of liquid to and from the piston member, one of said valve members also being free for movement at right angles to such direction, means for delivering liquid under pressure adjacent to said valve members, means permitting removal of liquid from points adjacent to the valve members, the valve members being provided with co-operating ports and shields adapted to seal each other from the liquid delivery means and the liquid removal means when the valve members stand in a given relative position with respect to each other, a passage adjacent to the valve members, and suitable ports in the valve members normally sealed from each other and permitting establishment of communication of the opposite sides of the piston member with said passage when said valve member is shifted in a direction at right angles to its normal direction of movement, substantially as described.

9. In a device of the class described, the combination of a motor member mounted for oscillation about a fixed axis, a radial piston member projecting therefrom, a liquid tight arcuate cylinder within which said piston member may swing, companion cylindrical valve members located co-axially with respect to the motor member, the innermost valve member being free for longitudinal movement as well as rotation, means for delivering liquid within said valve members at points adjacent to the extremes of movement of the radial piston member, means within said valve members permitting removal of liquid from points adjacent to the piston member, a passage enclosed by the valve members and underlying the motor member, the valve members being provided with co-operating ports and shields adapted to seal each other and the arcuate cylinder from the liquid delivery means and the liquid removal means when the valve members stand in a given relative position with respect to each other, and also being provided with ports permitting establishment of communication between opposite sides of the piston member within its cylinder when said valve member is shifted longitudinally, companion clutch members on the longitudinally movable valve member and the motor member mounted in position to lock together when the valve member is shifted longitudinally, spring means normally tending to move the valve member into the locking position aforesaid, and fluid pressure operated means connected to said valve member and subject to the pressure of fluid delivered to the device and operating in opposition to said spring means, substantially as described.

10. In a device of the class described, the combination of a piston member, companion valve members located adjacent thereto and normally adapted for movement in a direction parallel to the piston member, one valve member being free for movement at right angles to said direction, means for delivering liquid under pressure adjacent to the said valve members, means permitting removal of liquid from points adjacent to the piston member, the valve members being provided with co-operating ports and shields adapted to seal each other and the piston member from the liquid delivery means and the liquid removal means when the valve members stand in a given relative position with respect to each other, a passage lying opposite to the position of the piston member and longitudinally sealed therefrom, means for unsealing said passage when the right angularly shiftable valve member is so shifted, companion clutch members on the right angularly movable valve member and the piston member mounted in position to lock together when said valve member is shifted right angularly, and spring means and fluid pressure operated means working in opposition to each other and connected to said valve member, other and connected to said valve member effectively to shift the same according to the dominant force, substantially as described.

11. In a device of the class described, the combination of a piston member, companion valve members located adjacent thereto and normally adapted for movement in a direction parallel to the piston member, one valve member being free for movement at right angles to said direction, means for delivering liquid under pressure adjacent to the said valve members, means permitting removal of liquid from points adjacent to the piston member, the valve members being provided with co-operating ports and shields adapted to seal each other and the piston member from the liquid delivery means and the liquid removal means when the valve members stand in a given relative position with respect to each other, a passage lying opposite to the position of the piston member and longitudinally sealed therefrom, means for unsealing said passage when the right angularly shiftable valve member is so shifted, and companion clutch members on the right angularly movable valve member and the piston member mounted in position to lock together when the valve member is so shifted, substantially as described.

12. In a device of the class described, the combination of a piston member, companion valve members located adjacent to the same and normally adapted for movement in a direction parallel to the piston movements, one of said valve members being free for movement at right angles to said direction, means for delivering liquid under pressure adjacent to said valve members, means permitting removal of liquid from points adjacent to the piston member, the valve members being provided with co-operating ports and shields adapted to seal each other from the liquid delivery means and the liquid removal means when the valve members stand in a given relative position with respect to each other, companion clutch members on the right angularly movable valve member and the piston member mounted in position to lock together when said valve member is so shifted, spring means normally tending to move the valve member into the locking position aforesaid, and fluid pressure operated means tending to resist such spring means, substantially as described.

13. In a device of the class described, the combination of a piston member, companion valve members located adjacent to the same and normally adapted for movement in a direction parallel to the piston movements, one of said valve members being free for movement at right angles to said direction, means for delivering liquid under pressure adjacent to said valve members, means permitting removal of liquid from points adjacent to the piston member, the valve members being provided with co-operating ports and shields adapted to seal each other from the liquid delivery means and the liquid removal means when the valve members stand in a given relative position with respect to each other, companion clutch members on the right angularly movable valve member and the piston member mounted in position to lock together when the valve member is so shifted, and spring means and fluid pressure operated means working in opposition to each other and connected to said valve member effectively to shift the same according to the dominant force, substantially as described.

14. In a device of the class described, the combination of a piston member, companion valve members located adjacent to the same and normally adapted for movement in a direction parallel to the piston movements, one of said valve members being free for movement at right angles to said direction, means for delivering liquid under pressure adjacent to said valve members, means permitting removal of liquid from points adjacent to the piston member, the valve members being provided with co-operating ports and shields adapted to seal each other from the liquid delivery means and the liquid removal means when the valve members stand in a given relative position with respect to each other, and companion clutch members on the right angularly shiftable valve member and the piston member mounted in position to lock together when said valve member is so shifted, substantially as described.

15. In a device of the class described, the combination of a fluid operated motor member, valve means for controlling the operation of the same, means for delivering fluid under pressure adjacent to said valve means, means permitting removal of liquid from said valve means, companion clutch members on the valve means and the motor member, spring means tending to lock said clutch members together, and fluid pressure operated means connected to the valve means and subject to the pressure of fluid delivered to the device and operating in opposition to said springs means, substantially as described.

16. In a device of the class described, the combination of a fluid operated motor member, valve means for controlling the operation of the same, means for delivering fluid under pressure adjacent to said valve means, means permitting removal of liquid from said valve means, companion clutch members on the valve means and the motor member, and fluid pressure operated means connected to the valve means and subject to the pressure of fluid delivered to the device tending to disengage the clutch means, substantially as described.

17. In a device of the class described, the combination of a fluid operated motor member, valve means for controlling the operation of the same, connections for operating said valve means, means for delivering fluid under pressure adjacent to said valve means, means permitting removal of liquid from said valve means, companion clutch members on the valve means and the motor member, and fluid pressure operated means connected to the valve means tending to disengage the clutch means, substantially as described.

18. In a device of the class described, the combination of a fluid pressure operated motor, valve means for controlling the operation of the same, connections for operating said valve means, means for delivering fluid under pressure adjacent to said valve means, means permitting removal of fluid from said valve means, companion clutch members on the valve means and the motor member, and means under control of the pressure of fluid delivered to the device for controlling the operation of said clutch means, substantially as described.

19. In a device of the class described, the combination of a fluid operated motor member, a valve for normally controlling the operation of the same by fluid pressure connections for operating said valve means, clutch members between the valve and the motor member, means tending to bring said clutch members into engagement effectively to lock the valve and motor members together, and fluid pressure operated means acting in opposition thereto to disengage the clutch means, substantially as described.

20. In a device of the class described, the combination of a fluid operated motor member, valve means for normally controlling the operation of the same by fluid pressure, connections for operating said valve means, said valve means normally occupying a given relative position with respect to the motor member, means tending to lock the valve means and motor member together in such relative position, and fluid pressure operated means acting in opposition to said locking means, substantially as described.

21. In a device of the class described, the combination of a fluid operated motor member, valve means for controlling the normal operation of the same by fluid pressure, connections for operating said valve means, said valve means normally occupying a given relative position with respect to the motor member in which position the valve means and motor member are free to move relatively with respect to each other, clutch means operable at times effectively to lock the valve means and motor member together at another relative position of said parts with respect to each other, and spring means tending to move the valve means and motor member of their second mentioned relative position, substantially as described.

22. In a device of the class described, the combination of a fluid operated motor member, valve means for controlling the normal operation of the same by fluid pressure, said valve means and motor member normally occupying a given relative position with respect to each other means for moving the valve means under control of the operator, and spring means normally tending to retain the valve means and motor member in such relative position, substantially as described.

23. In a device of the class described, the combination of a fluid operated motor member, valve means for controlling the normal operation of the same by fluid pressure, said valve means having a direction of movement parallel to a part which is connected to the motor member, and also normally occupying a given relative position with respect to said part, spring means normally tending to retain the valve means and said part in said relative position, clutch means for locking the valve member and said part together, and means for adjusting the effective locking position of said clutch means effectively to insure locking action at the desired relative position between the valve means and the part which is connected to the motor member, substantially as described.

24. In a device of the class described, the combination of a swinging fluid operated motor member, a swinging valve member co-axial therewith for controlling the normal operation of the motor member by fluid pressure, a shaft co-axial with said valve and connected therewith, a worm gear on said shaft, another shaft nonparallel to the first shaft, a worm thereon meshing with the worm gear, and clutch means between the first mentioned shaft and the motor member operative at times effectively to said openings being more widely separated from the piston member than the first mentioned port openings, said shaft to the motor member, substantially as described.

25. In a device of the class described, the combination of parts including a swinging fluid operated motor member, a valve co-axial therewith, a shaft co-axial with said valve and connected thereto, means for turning said shaft, and clutch means between said shaft and the motor member effective at times to establish a service of direct mechanical connections between the parts, substantially as described.

26. In a device of the class described, the combination of a swinging fluid operated motor member, a valve co-axial therewith for controlling the normal operation of the same by fluid pressure, a shaft co-axial with said valve and connected thereto, another shaft in line with the first mentioned shaft, an operative connection between the motor member and the second mentioned shaft, a worm gear on the first mentioned shaft, and clutch means operative at times effectively to establish a series of direct mechanical connections between the two shafts, substantially as described.

27. In a device of the class described, the combination of two shafts in line with each other, fluid operated means between said shafts and including a fluid operated motor member means for controlling operation of the valve shaft and a fluid operated valve member, said motor member and valve member normally occupying a given relative position with respect to each other at which delivery of liquid to and from the motor member is sealed by the valve member, an operative connection between one shaft and the valve member, an operative connection between the other shaft and the motor member, and means for at times locking said shaft and valve directly to said shaft and motor member and for simultaneously permitting the free interchange of fluid past the motor member, substantially as described.

28. In a device of the class described, the combination of a casing end plate, a circular hub projecting therefrom and rigid therewith, there being suitable passages in said hub for delivery and return of operating fluid, a cylindrical valve member rotatably mounted on the hub, a driving shaft co-axial with the hub and valve member, an operative connection between said shaft and valve member, a control shaft, an operative connection between the control shaft and the driving shaft, a cylindrical fluid motor member rotatably mounted on the valve member and including a swinging piston, a driven shaft aligned with the driving shaft and beyond the position of the operative connection aforesaid, an operative connection between the motor member and the driven shaft reaching around the operative connection aforesaid, clutch means intermediate between the motor member and valve member and normally disengaged, and a housing in conjunction with the end plate aforesaid housing all of said parts in liquid tight fashion, the driven shaft reaching through the housing at one point and the control shaft reaching through the housing at another point, substantially as described.

29. In a steering gear, the combination of a piston having an extreme range of movement, companion valve members located adjacent to the piston member, means for delivering liquid to said valve members at points adjacent to the extremes of movement of the piston member, means permitting removal of liquid from points adjacent to the piston member, the valve members being provided with cooperating ports and shields adapted to seal each other and the piston member from the liquid delivery means and the liquid removal means when the valve members stand in a given relative position with respect to each other, an air cushion tank, a connection for delivering liquid under pressure to said tank and to the liquid delivery means aforesaid, and a check valve in said connection effective to prevent back flow of liquid therethrough, substantially as described.

30. In a steering gear, the combination of a piston member having an extreme range of movement, companion valve members located adjacent to the piston member, means for delivering liquids to said valve members at points adjacent to the extremes of movement of the piston member, means permitting removal of liquid from points adjacent to the piston member, the valve members being provided with cooperating ports and shields adapted to seal each other and the piston member from the liquid delivery means and the liquid removal means when the valve members stand in a given relative position with respect to each other, a connection for delivering liquid under pressure to the liquid delivery means aforesaid, and a check valve in said connection effective to prevent back flow of liquid therethrough, substantially as described.

31. In a steering gear, the combination of a piston member having an extreme range of movement, companion valve members, located adjacent to the piston member, means for delivering liquid to said valve members at point adjacent to the extremes of movement of the piston member, means permitting removal of liquid from points adjacent to the piston member, the valve members being provided with co-operating ports and shields adapted to seal each other and the piston member from the liquid delivery means and the liquid removal means when the valve members stand in a given relative position with respect to each other, a connection for delivering liquid under pressure to said device, and means for preventing back flow of liquid therethrough, substantially as described.

THOMAS A. BANNING, Jr.

CERTIFICATE OF CORRECTION.

Patent No. 1,710,399.   Granted April 23, 1929, to

THOMAS A. BANNING, JR.

It is hereby certified that error appears in the printed specification of the above numbered patent requiring correction as follows: Page 15, lines 101 to 104, claim 24, strike out the words and comma "said openings being more widely separated from the piston member than the first mentioned port openings", and insert instead "establish a series of direct mechanical connections from"; same page, line 113, claim 25, for the word "service" read "series"; and that the said Letters Patent should be read with these corrections therein that the same may conform to the record of the case in the Patent Office.

Signed and sealed this 28th day of May, A. D. 1929.

(Seal)

M. J. Moore,
Acting Commissioner of Patents.